3,469,989
ANIMAL FEED SUPPLEMENT CONTAINING A SALT OF SUCROSE PHOSPHATE

Julian Gagolski, Chatswood, New South Wales, and Bruce M. Smythe, Roseville, New South Wales, Australia, assignors to The Colonial Sugar Refining Company, Limited, New South Wales, Australia
No Drawing. Filed July 12, 1965, Ser. No. 471,413
Int. Cl. A23l 1/16
U.S. Cl. 99—2      7 Claims

ABSTRACT OF THE DISCLOSURE

An animal feed supplement, for example a salt block, having incorporated therein a soluble, non-toxic mineral metal salt of a sugar, for example sucrose, phosphate or a soluble, non-toxic, trace mineral metal complex of such a mineral metal salt of a sugar phosphate, for supplying to an anmial, in assimilable form and in proportions as required, dietary mineral metals such as calcium, magnesium, sodium, potassium, cobalt, zinc, iron, copper and manganese.

---

This invention relates to animal nutrition, and more particularly to palatable, nutritional organic phosphate compositions which are especially useful as dietary supplements for animals (e.g. ruminants and poultry) to provide inter alia the principal and/or trace mineral element requirements.

As is known, animal feeds are constituted broadly of two classes or types of nutrients, namely plant ingredients (which constitute the preponderant part of the feed) and minor but essential amounts of mineral ingredients.

The greater part of the mineral content of the animal body is made up of a few mineral elements including phosphorus, calcium, potassium, sodium, sulphur and chlorine. In some locales and under normal conditions the average animal diet is adequately supplied with these principal mineral elements, although in many parts of the world malnutrition of animals is directly attributable to a deficiency of phosphorus in feed-stuffs grown in such areas.

The nutritional demands of the animal require other dietary minerals in relatively small amounts as compared to the noted principal mineral elements and are commonly designated as "trace elements" or "trace minerals," such as magnesium, iron, copper, manganese, cobalt and the like. In many circumstances, due largely to soil deficiencies, the normal animal diet derived from plant growth does not contain sufficient of the necessary elements to supply the animal dietary requirements. To meet these deficiencies, which may vary in different locales and from time to time, dietary supplements are added to the animal feed or basal ration.

Additionally, in some prepared feeds for domestic farm animals it is the practice to incorporate ancillary protein dietary constituents such as fish meal, ground meat scraps and in many cases, especially in feeds for young animal growth and health stimulation, accessory dietary factors such as vitamins and amino acids.

In one aspect, the invention relates to the use of readily metabolized phosphate esters of sugars for animal nutrition either alone or in conjunction or admixture with animal feeds or animal feed ingredients. In another aspect the invention relates to the use of salts and/or complexes of such compounds to supply trace elements to animal feeds to provide balanced rations.

A major object of the invention is to provide novel animal nutrients.

Another object of the invention is to provide an improved fortified animal feed.

A further object of the invention is to provide a completely nutritional animal feed ingredient embodying a selected trace element required in animal nutrition.

Yet another object is to provide a soluble, nutritionally available and palatable organic phosphate for incorporation in animal feeds.

Yet a further object of the invention is to provide an economic animal feed supplement providing readily assimilable carbohydrate nutrients and mineral elements.

A still further object of the invention is to provide readily assimilable novel sugar phosphate esters complexed with dietary mineral elements.

It has been found that compositions particularly suitable for use as animal nutrients and especially as feed additives or supplements, providing nutritionally available essential mineral elements together with carbohydrates, may be produced from relatively cheap polyhydroxy substances of the class known as sugars whereby are provided compositions embodying in one molecule a nutritional moiety, such as sucrose, nutritionally available phosphorus, together with other essential mineral elements.

As will be seen more fully hereinafter and as has been described in co-pending United States patent application Ser. No. 262,230 filed Mar. 1, 1963, and now abandoned such sugar phosphates as sucrose phosphate may readily be prepared by the reaction of phosphorus oxychloride with a solution of sucrose in a suitable reaction solvent and in the presence of stoichiometric amounts of calcium oxide or hydroxide or carbonate, to produce a complex mixture of various sucrose phosphates containing some inorganic phosphate. The calcium sucrose phosphate initially formed may be readily converted to a series of other salts by simple replacement of the cation, for example by sodium, potassium, ammonium, pyridinium, and other organic bases, for example various alkaloids, cyclohexylamine and the like. In addition to being able to form a large series of salts with various cations involved in the animal metabolism these sucrose phosphates are capable of forming complexes with many cations.

As an example of the aforesaid procedure 350 grams of sucrose is dissolved in 1.5 liters of distilled water, 140 grams of calcium oxide is suspended in the solution, which is mixed and cooled to 0° C. A solution of 153.4 grams of phosphorus oxychloride dissolved in 150 ml. of trichloroethylene is added slowly, while vigorously agitating the reaction mixture in a cooling bath to maintain the temperature at approximately 0° C. The addition of the oxychloride solution requires about three hours. Upon completion of the reaction the mixture is filtered and the filtrate concentrated to approximately 60% solids. This concentrate is added slowly with vigorous agitation to sufficient ethanol to yield a final concentration of 80% of ethanol by volume. The calcium sucrose phosphate is precipitated as a fine white powder which is filtered off and dried. This product contains about 12% calcium chloride which may be removed by repeating the precipitating procedure five or six more times.

Other salts of sucrose phosphate may be made from the calcium salt by simple replacement of the cation. One effective method comprises passing an aqueous solution of the calcium salt through a cation exchange resin in hydrogen form to remove the calcium, then neutralizing the ester solution with a selected base containing the desired metal, for example, sodium hydroxide.

Additional methods of preparing the sugar phosphate salts of ions other than calcium include (i) double-decomposition reactions, which precipitate the extraneous ions as an insoluble salt, and (ii) the direct neutralization of sucrose phosphoric acid by the corresponding base (if soluble) or with an excess of the freshly-precipitated hydroxide.

As an example of the double-decomposition reaction, the preparation of stannous sucrose phosphate may be cited. A solution of 50 grams of calcium sucrose phosphate in 500 ml. of water is added slowly, with agitation, to a solution of 24.6 gms. of stannous fluoride in 500 ml. of water. The insoluble calcium fluoride is removed by filtration and the stannous sucrose phosphate solution is evaporated to dryness at 50° C. under vacuum.

The acid-base neutralization reaction may be illustrated by the preparation of sodium sucrose phosphate. Sucrose phosphoric acid is prepared by passing a calcium sucrose phosphate solution through a column charged with a cation exchange resin in the acid form, the calcium ions thereby being exchanged for hydrogen ions. The stoichiometric equivalent of sodium hydroxide is then added to neutralize the acid.

The preparation of nickel sucrose phosphate may be cited as an example of the preparation of a metal ion salt by reacting the sucrose phosphoric acid with excess freshly precipitated metal ion hydroxide. After removal of excess nickel hydroxide by filtration, the nickel salt is recovered by evaporation of the filtrate to dryness.

The compositions of the invention have physical and chemical characteristics which establish them as particularly suitable for use in animal nutrition.

All the metal salts of sucrose phosphate are extremely soluble in water and this is also true of the salts of sucrose phosphate with alkaloids, cyclohexylamine and other similar organic bases. This is in sharp contrast to inorganic phosphates which, with the exception of the phosphates of alkali metal, ammonia and lower molecular weight substituted ammonium ions, are relatively insoluble in water. It appears that the attachment of the highly hydrophilic sugar moiety to the phosphate group in such salts increases their solubility to such an extent that they dissolve in aqueous solution. This solubilizing influence of the sugar moiety probably depends upon the number and configuration of the hydroxyl groups. In aqueous solutions of sugars, these hydroxyl groups are hydrogen bonded to water molecules and this accounts for the high solubility of sugars generally in water.

An important characteristic of sugar phosphates is their complexing ability. As is known, most inorganic phosphates have some complexing or sequestering ability with various metals. This property is most pronounced in the case of chain phosphates but is of no practical value in the case of ring phosphates. The sugar phosphate esters and salts thereof employed as animal nutrients according to the invention in effect combine in one molecule the complexing properties of the inorganic chain phosphates with aqueous solubility characteristics.

The described phosphate esters and salts thereof can be complexed with nutrient trace metals; for example, sodium sugar phosphates can be complexed with iron to form sodium iron sugar phosphates. Thus, by substituting different cations for the calcium of calcium sugar phosphates and complexing these salts with an additional cation, a wide range of compounds can be produced containing in the molecule valuable components to provide for example an assimilable principal element and an assimilable trace mineral element, such as calcium, magnesium, sodium, potassium, cobalt, copper, iron, zinc and manganese.

Typically, potassium ferric sucrose phosphate may be obtained by first replacing the calcium of calcium sucrose phosphate by potassium ions, followed by adding ferric ions at a suitable pH. By way of example, a solution of 100 gm. of calcium sucrose phosphate in 100 ml. of water is added slowly to a solution of 48.2 gm. of potassium oxalate in 200 ml. of water. The precipitate of calcium oxalate thus formed is removed by filtration. Then, 20 ml. of 10% ferric chloride solution and 14 ml. of 4% sodium hydroxide solution is added to the filtrate. The characteristic deep-red color of the complex appears and the potassium salt of the complex is precipitated, as an oil, on the addition of alcohol. The oil is dried to a brown powder under vacuum at 40° C.

The copper, manganous, cobalt and the like complexes may be prepared in a similar fashion and the potassium ion may be replaced by other suitable cations.

The products of the invention have a wide range of utility in the animal nutrient field. Thus, they may be incorporated in salt blocks in proportioned amounts to provide for example trace mineralized salt compositions for supplying balanced mineral requirements as well as nutritient carbohydrate. They may be added to supplement feeds to add palatability as well as nutritional value.

In the past it has been proposed to provide nitrogen-containing feed supplements for ruminants by ammoniating liquid sugar-containing material for the purpose of providing nitrogen in an assimilable form as a partial substitute for more expensive protein feeds. This product may be used as such or may be combined with roughage, and in the latter case it provides readily available foods for the micro-organisms of the rumen which digests the cellulosic roughage to make it available to the animal. Such ammoniated products as produced are alkaline and to avoid toxic effects it has been found desirable to add acid to reduce the pH down to about 4.

The ammonium sugar salts subject of the present invention, which are not strongly alkaline, may be employed in lieu of such hitherto known ammoniated sugar products; alternatively, sugar phosphoric esters may be added to ammoniated sugar syrup to adjust the pH of the blend to the desired value.

Also, the sugar phosphate of this invention may be admixed in solid or liquid form and in proportioned amounts with urea as a feed supplement for ruminants.

The products of the invention may be employed to balance the variations in nitrogenous and energy-producing fodder. As is known, in such feeds the mineral matter must be assessed both qualitatively and quantitatively to meet the needs of the animal. Employment of the selected salts of sugar phosphates provides a simple method of providing animals, in a palatable readily assimilable form, with carbohydrate, phosphorus, and the principal as well as trace mineral elements.

It will thus be seen that the products of the invention have a wide range of utility in the animal nutrition field. They can be employed in dry form in admixture with other ingredients of a basal ration or feed supplement, or they can be used in liquid form for admixture with mashes or for spraying on cellulosic roughage and the like.

It will be understood that, while the invention has been described with particular reference to sucrose phosphate, the scope of the invention is not limited to this compound and its salts but embraces similar phosphoric esters and ester salts of sugars generally, typical other members of the class being glucose, fructose, maltose, lactose, raffinose, arabinose, galactose. The sugar esters generally may be prepared in the same manner as the described production of calcium sucrose phosphate.

While preferred embodiments of the invention have been described it will be understood that these are given as illustration and not as limiting the scope of the invention except as such limitations are imposed by the appended claims.

We claim:
1. An animal feed supplement having incorporated therein a water soluble, non-toxic mineral element salt of sucrose phosphate, said mineral element being a mineral element selected from the group consisting of calcium, magnesium, sodium, potassium, cobalt, zinc, iron, copper and manganese.

2. An animal feed supplement having incorporated therein calcium sucrose phosphate.

3. An animal feed supplement having incorporated therein potassium sucrose phosphate.

4. An animal feed supplement having incorporated therein magnesium sucrose phosphate.

5. An animal feed supplement having incorporated therein a water soluble, non-toxic ammonium salt of sucrose phosphate.

6. An animal feed supplement having incorporated therein a water soluble, non-toxic trace metal complex of a mineral element salt of sucrose phosphate, said trace metal being a trace metal selected from the group consisting of magnesium, cobalt, zinc, iron, copper and manganese, and said mineral element being a metal different from said trace metal, said mineral element being a mineral element selected from the group consisting of calcium, magnesium, sodium, potassium, cobalt, zinc, iron, copper and manganese.

7. An animal feed supplement having incorporated therein an iron complex of calcium sucrose phosphate.

References Cited

UNITED STATES PATENTS 3,080,234   3/1963   Jarowski _____ 99—2

FOREIGN PATENTS 247,809   2/1910   Germany.

ALVIN E. TANENHOLTZ, Primary Examiner

U.S. Cl. X.R.

260—234